B. H. VELLINES.
Peanut-Cleaner.
No. 209,730. Patented Nov. 5, 1878.
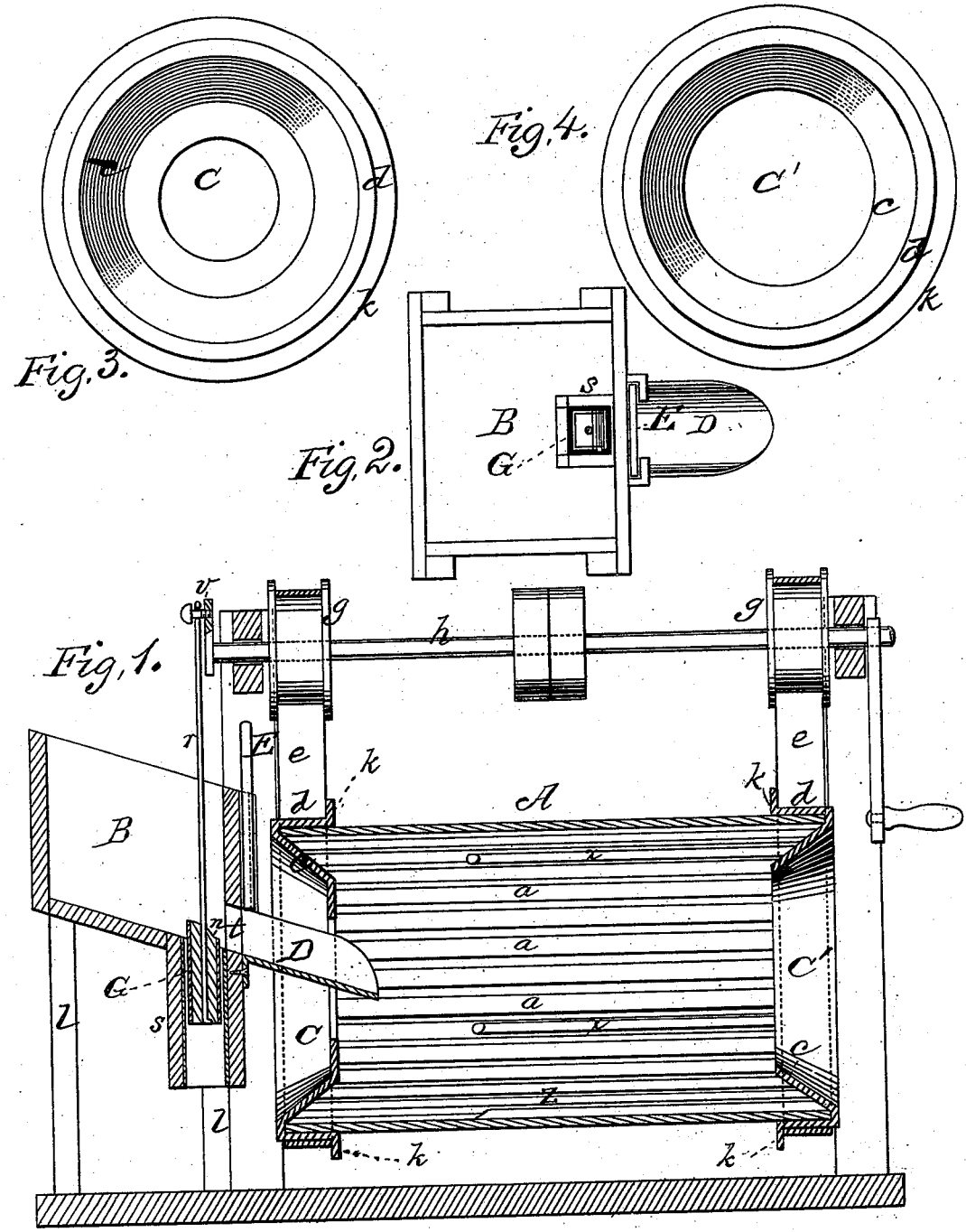

UNITED STATES PATENT OFFICE.

BENTON H. VELLINES, OF NORFOLK, VIRGINIA.

IMPROVEMENT IN PEANUT-CLEANERS.

Specification forming part of Letters Patent No. 209,730, dated November 5, 1878; application filed September 7, 1878.

*To all whom it may concern:*

Be it known that I, BENTON HARPER VELLINES, of Norfolk, in the county of Norfolk and State of Virginia, have invented a new and valuable Improvement in Machines for Cleaning Peanuts and other articles; and I do hereby declare that the following is a full, clear, and exact description of the construction and operation of the same, reference being had to the annexed drawings, making a part of this specification, and to the letters of reference marked thereon.

Figure 1 of the drawings is a representation of a vertical longitudinal section of this invention. Fig. 2 is a top view of the feed-box. Fig. 3 is an end view, showing the feeding-cylinder head; and Fig. 4 is an end view, showing the discharging-cylinder head.

This invention has relation to machines for cleaning peanuts, grain, seed, and other articles; and it consists, mainly, in the construction and novel arrangement of the concave annular cylinder-heads, the inside lifting-ribs, and the automatic feed, all hereinafter fully shown and described.

These improvements relate chiefly to end-feeding and end-discharging cylinder machines, wherein the object is to maintain a uniform feed and discharge, and at the same time to keep the articles in the cylinder long enough to insure a thorough cleaning.

In the accompanying drawings, the letter A designates the cleaning-cylinder, and B the feed-box. For cleaning peanuts, the body of the cylinder is formed of equidistant slats or bars $a$, the spaces between these slats being sufficiently narrow to prevent the nuts in the shell from escaping, and yet wide enough to discharge all the kernels or shelled nuts which may be fed into the machine. The sides of the slats $a$, which form the walls of the spaces $b$, are parallel, so that as the slats are worn down by the attrition of the nuts against their inside faces the spaces will remain of the same width. Therefore each bar has its sides slightly beveled.

C C represent the cylinder-heads, to which the slats or bars $a$ are attached. These heads are usually formed by casting them of iron. Each head is annular in shape, having a central opening, serving for the feed or discharge, as the case may be, the feed-opening being the smaller. These heads therefore close the ends of the cylinder, with the exception of the central openings, and serve to hold the contents while the cylinder is rotating until relieved by the overflow-discharge. The form of the annular plate or portion $c$, bounding the central opening, is concave, or depressed from the outer circumference inward to the opening, the interior wall of this portion $c$ being inclined inward in a corresponding manner, as indicated in the drawings, and forming a guide, which, by throwing the nuts which have arrived at the end of the cylinder slightly inward or back, checks the discharge sufficiently to keep the cylinder properly filled during its operation. At the feed end of the cylinder the annular guide, being still farther extended toward the center because of the smaller opening, effectually prevents all escape of the nuts at this end. Between these heads the cylinder has therefore an annular holding-cavity, Z, extending from the cylinder-wall to the openings in said heads, in which the nuts or articles being cleaned are held for a time while passing through the cylinder, until a quantity has accumulated in this cavity, after which it will hold no larger quantity, but will discharge automatically, by overflow through the central opening in the discharge-head in a continuous manner, an amount equal to the quantity fed into the feed-opening at the other end of the cylinder. The feed from end to end, or along this cylinder, is effected by its rotation, its axis being slightly inclined downward from the feed end usually in the larger constructions. At its outer portion the concave guide joins the cylinder-flange $d$. Usually, as indicated above, the head is cast entire, the cylinder-flange extending backward from the concave guide over the ends of the slats, which are pressed home in the angle between the concave portion and the flange, and firmly secured to the latter by screws passing through perforations made therein, or by other suitable fastening. The cylinder-flanges being on the outside of the slats, there is no liability of their becoming loosened and detached on account of the pressure and working of the cylinder contents. The cylinder-flanges $d$ serve also as the pulleys or bearings for the suspension-bands $e$ in suspended cylinders, these bands extending over flanged pulleys $g$ of the operating-shaft $h$, whereby the cylinder is rotated, and in this construction an edge flange, $k$, is usually provided at the end of the cylinder-flange to prevent the band from working over on the slats.

The feed-box B is located above the level of the bottom of the cylinder, and adjacent to the end or head having the feed-opening. It may be supported by standards $l$, or otherwise. The bottom of the feed-box shelves toward the wall next the cylinder-head, and in said wall an opening, $t$, is made, through which the nuts pass to the spout or conductor D, which is inclined, and extends into the central feed-opening of the cylinder-head.

A gate, E, is arranged in ways on the wall of the hopper or feed-box, to slide up or down, for the purpose of regulating the quantity of nuts fed to the conductor, and thereby into the cylinder. Just within this wall, through the floor of the box B, at the lowest portion thereof, in front of the discharge-opening $t$, works a plunger, G, in a guide-box, $s$, which is secured to the feed-box. The plunger is connected to an eccentric or crank, $v$, on the pulley-shaft $h$, the end of which is extended over the feed-box by means of a connecting rod or stem, $r$, and thereby the plunger is worked up and down in its guide-box $s$. The upper end of this guide-box is made flush with the bottom of the feed-box, and the plunger is so arranged that at every stroke its upper end, which is inclined toward the conductor, is raised somewhat above the bottom of the feed-box, and then depressed below it. By the rising and falling of this plunger the nuts in the box are kept in motion and prevented from bridging in front of the feed-opening $t$, and thereby stopping the feed. In order to increase its efficiency, its face is provided with a fall or curved concavity, $n$, of greater inclination than that of the floor of the box, whereby an accelerated movement is given to the nuts in passing over it through the opening $t$ to the spout or conductor.

In order to prevent the wearing away of the plunger and its guide-box, when made of wood, the contact-walls of each are faced with metal.

Within the cylinder are arranged, on certain bars or slats, at equal distances from each other, the lifting or turning ribs $z$. These ribs project inward somewhat, and extend longitudinally from the discharging-head of the cylinder to a point about the middle of the cylinder, beyond which, or next the feeding-head, no ribs are required, because the discharge from the conductor, which is received in this portion of the cylinder, keeps up sufficient movement, and the dirt and trash are more readily discharged. The object of the ribs is to lift the bottom layers of nuts as the cylinder rotates, bringing them on top in succession, when they fall in a continual stream until the entire contents of the cylinder are thoroughly cleaned. In this operation the nuts fed in at the entrance-head are carried forward gradually by the rotation of the cylinder, and the nuts fed in behind them until the cylinder has its complement, according to the speed at which it is running, when, the feed being continued, the nuts are automatically discharged, through the large opening in the head at the other end, cleaned.

The cylinder is uniform in its work, cleaning all the nuts gradually as they pass from end to end, and discharging the same regularly, the first fed before the last until the entire work is accomplished.

Having described this invention, what I claim, and desire to secure by Letters Patent, is—

1. The combination, with rotary cleaning-cylinder having an annular holding-cavity and a central automatic overflow-discharge, of an automatic feed, substantially as specified.

2. A feed-box having the rising and falling plunger, working in guides below its inclined bottom, at the lowest portion thereof, in front of the discharge-opening, substantially as specified.

3. The cleaning-cylinder having the annular concave check-heads, guiding the falling contents inward as they are carried over, and thereby preventing accidental or undue discharge, substantially as specified.

4. In a cleaning-cylinder, the combination, with the concave annular head C', of the short lifting-ribs $z$, extending from the discharging-head a portion of the length of the cylinder, substantially as specified.

5. The concave annular heads cast with reversed cylinder-flanges, to the inside of which the slats or body of the cylinder is fastened, substantially as specified.

In testimony that I claim the above I have hereunto subscribed my name in the presence of two witnesses.

BENTON H. VELLINES.

Witnesses:
WALTER C. MASI,
K. B. ELLIOTT.